United States Patent
Shibata et al.

(10) Patent No.: US 6,538,674 B1
(45) Date of Patent: Mar. 25, 2003

(54) GEOGRAPHIC INFORMATION DISPLAY CONTROL SYSTEM

(75) Inventors: Norimasa Shibata, Hitachi (JP); Keiro Muro, Higashikurume (JP); Yasuei Nomoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,172

(22) Filed: Jan. 27, 2000

(30) Foreign Application Priority Data

Feb. 1, 1999 (JP) .......................................... 11-023409

(51) Int. Cl.[7] .............................................. G06T 11/40
(52) U.S. Cl. ....................................... 345/855; 340/440
(58) Field of Search ................................ 345/804, 764, 345/854, 803, 440, 968, 855; 705/3, 4, 5

(56) References Cited

U.S. PATENT DOCUMENTS 6,173,277 B1 * 1/2001 Ashby et al. .................. 707/1
6,262,741 B1 * 7/2001 Davies ........................ 345/425
6,307,573 B1 * 10/2001 Barros ........................ 345/764

* cited by examiner

Primary Examiner—Cao H. Nguyen
(74) Attorney, Agent, or Firm—Kenyon & Kenyon

(57) ABSTRACT

A geographic information display control system displays objective geographic information using geographic data stored in a plurality of databases. A plurality of geographic data acquiring units instruct acquiring conditions, including a job script generated from a job selection, for acquiring the geographic data stored in the plurality of databases, and a processing request receiver determines, based on an attribute of the geographic data necessary for displaying the objective geographic information, which geographic data acquiring processor among the plurality of geographic data acquiring processors is requested to execute processing. As a result, a user can obtain required geographic data without knowledge of where the desired geographic data is or without being aware of where the knowledge is prepared.

20 Claims, 10 Drawing Sheets

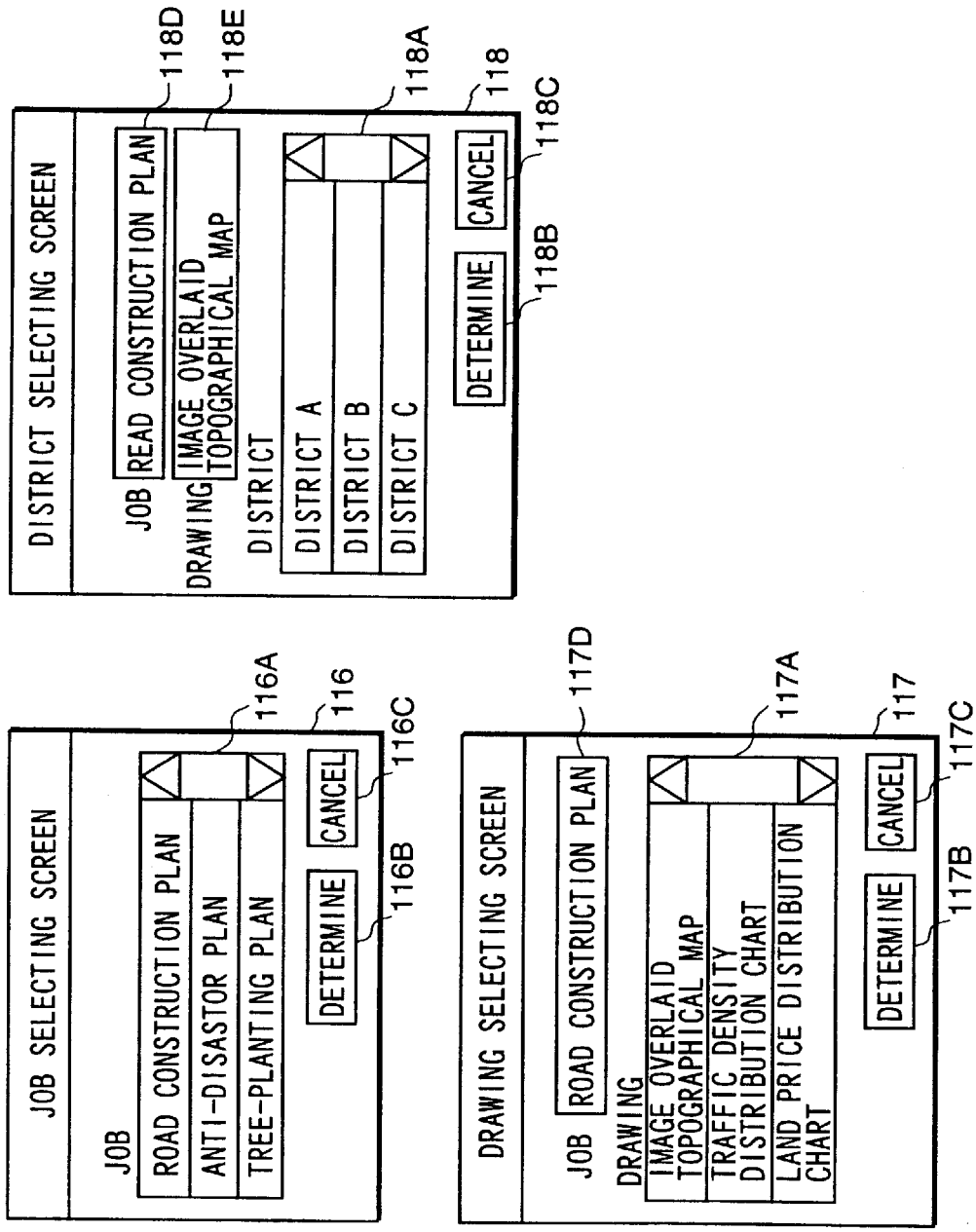

FIG. 6

EXAMPLE OF DRAWING ELEMENT TABLE

| KB1 313A DRAWING | 313B ELEMENT DATA | 313C CLASSIFICATION |
|---|---|---|
| IMAGE OVERLAID TOPOGRAPHICAL MAP | AERIAL PHOTOGRAPH | IMAGE |
| IMAGE OVERLAID TOPOGRAPHICAL MAP | CONTOUR MAP | TOPOGRAPHICAL MAP |
| IMAGE OVERLAID TOPOGRAPHICAL MAP | RIVER MAP | TOPOGRAPHICAL MAP |
| IMAGE OVERLAID TOPOGRAPHICAL MAP | ROAD MAP | TOPOGRAPHICAL MAP |
| IMAGE OVERLAID TOPOGRAPHICAL MAP | HOUSE MAP | RESIDENTIAL AREA MAP |
| TRAFFIC DENSITY DISTRIBTUION CHART | TRAFFIC | SEARCH DATA |
| TRAFFIC DENSITY DISTRIBTUION CHART | ROAD MAP | TOPOGRAPHICAL MAP |
| LAND PRICE DISTRIBUTION CHART | PRICE OF LAND | SEARCH DATA |
| LAND PRICE DISTRIBUTION CHART | HOUSE MAP | RESIDENTIAL AREA MAP |
| LAND PRICE DISTRIBUTION CHART | LOAD MAP | TOPOGRAPHICAL MAP |

313

EXAMPLE OF KNOWLEDGE PROCESSING REQUEST RECEIVER TABLE

| KB1 314A DISTRICT | 314B CLASSIFICATION | 314C KNOWLEDGE PROCESSING REQUEST RECEIVER |
|---|---|---|
| DISTRICT A | IMAGE | KMBS2 |
| DISTRICT A | TOPOGRAPHICAL MAP | KMBS3 |
| DISTRICT A | RESIDENTIAL AREA MAP | KMBS4 |
| DISTRICT A | SEARCH DATA | KMBS5 |
| DISTRICT B | IMAGE | KMBS2 |
| DISTRICT B | TOPOGRAPHICAL MAP | KMBS3 |
| DISTRICT B | RESIDENTIAL AREA MAP | KMBS6 |
| DISTRICT B | SEARCH DATA | KMBS5 |

EXAMPLE OF GEOGRAPHICA-DATA ACQUIRING CONDITION TABLE

KB2

| DISTRICT | ELEMENT DATA | DB NAME | DATA ACQUIRING METHOD | DATA CONVERSION METHOD |
|---|---|---|---|---|
| DISTRICT A | AERIAL PHOTOGRAPH | DB1 | FTP | NORMALIZATION PROCESSING |
| DISTRICT B | AERIAL PHOTOGRAPH | DB1 | FTP | NORMALIZATION PROCESSING |

KB3

| DISTRICT | ELEMENT DATA | DB NAME | DATA ACQUIRING METHOD | DATA CONVERSION METHOD |
|---|---|---|---|---|
| DISTRICT A | CONTOUR MAP | DB4 | FTP | FORMAT CONVERSION |
| DISTRICT A | RIVER MAP | DB4 | FTP | FORMAT CONVERSION |
| DISTRICT A | ROAD MAP | DB4 | FTP | FORMAT CONVERSION |
| DISTRICT B | CONTOUR MAP | DB5 | FTP | FORMAT CONVERSION |
| DISTRICT B | RIVER MAP | DB5 | FTP | FORMAT CONVERSION |
| DISTRICT B | ROAD MAP | DB5 | FTP | FORMAT CONVERSION |

KB4

| DISTRICT | ELEMENT DATA | DB NAME | DATA ACQUIRING METHOD | DATA CONVERSION METHOD |
|---|---|---|---|---|
| DISTRICT A | HOUSE MAP | DB9 | SQL | NONE |

GEOGRAPHIC INFORMATION DISPLAY CONTROL SYSTEM

BACKGROUND OF THE INVENTION

In recent years, there have been attempts to make use of various different kinds of geographic data by overlaying them for human's judgment. For example, by overlaying an item of geographic data and an item of image data, characteristics of an objective district can be recognized in more detail. However, all the various kinds of geographic data are not always prepared In a unified standard. Formats describing the items of geographic data such as data formats are different from one another depending on an organization preparing the geographic data. In a case where such items of geographic data are used by overlaying them, it can be considered that the items of geographic data are stored in a single database by executing format transformation in advance. However, since each of the organizations preparing the geographic data individually updated the geographic data, the database of geographic data must be divided into individual databases in the organization basis. Therefore, the geographic data is generally stored in a plurality of databases. There are needs for unifying and using the items of data different in describing formats distributed in a network or the like, as described above. For example, Japanese Patent Application Laid-Open No.10-49409 proposes a method of making use of different kinds of data by unifying different kinds of databases through knowledge processing.

In order to unify and use the items of geographic data different in describing formats, it is necessary to define conditions of acquiring the Items of geographic data different in describing formats as knowledge, and to make use of the geographic data based on the knowledge. However, it is difficult for a single organization to prepare all of the various kinds of knowledge, and knowledge construction in regard to geographic data is performed by an organization understanding the geographic data used in enough detail or an organization frequently using specified geographic data. As a result, the knowledge bases are also stored in being distributed depending on skilled fields of geographic data treated by the organization preparing the geographic data. Therefore, a user of the geographic data must have information on where the knowledge to be required is in prior to using the knowledge in regard to the geographic data.

SUMMARY OF THE INVENTION

The present invention relates to a geographic information display control system which displays geographic information using items of geographic data stored in a plurality of geographic data storing means. An object of the present invention is to provide a geographic information display control system which is capable of easily displaying geographic information using the items of geographic data stored in the plurality of databases. The present invention comprises a plurality of geographic data acquiring means for instructing acquiring conditions to acquiring the geographic data stored in the plurality of databases, and a processing request receiver determining means determines based on an attribute of the geographic data to be displayed which geographic data acquiring means among the plurality of geographic data acquiring means is requested to execute processing. The geographic data is data including coordinate information, and is map data such as topological map, image data such as aerial photograph, satellite image, fixed point survey data in regard to precipitation, temperature and the like. The acquiring conditions means location of a database storing geographic data, procedure such as protocol acquiring the geographic data from the database, procedure converting describing format such as a data format, coordinate, language and the like.

It is preferable that both of the knowledge processing request receiver judging means and the geographical data acquiring condition judging means in accordance with the present invention use knowledge processing means deriving results by processing knowledge. In this case, there is an advantage of simple construction because both of the knowledge processing request receiver judging means and the geographical data acquiring condition judging means are executed using similar knowledge processing.

According to the present invention, the knowledge processing request receiver judging means request the geographic data acquiring condition judging means to execute knowledge processing corresponding to geographic data requested to be displayed by a user (requested geographic data), and instructs the user on conditions of acquiring the geographic data stored in the plurality of geographic data storing means. Therefore, the user can obtain required geographic data only by inquiring a single knowledge processing request receiver judging means without knowledge on where the searched geographic data is or without being aware of where the knowledge is prepared.

BRIEF DESCRIPTION OF DRAWINGS

FIG. 5 is a view showing an example of a display content selecting screen.

FIG. 6 is a view showing the contents of a drawing element table and a knowledge processing request receiver table in the knowledge storing part.

FIG. 7 is a view showing the content of a geographic data acquiring condition table in the knowledge storing part.

DESCRIPTION OF THE PREFERRED EMBODIMENTS

Figure 1:
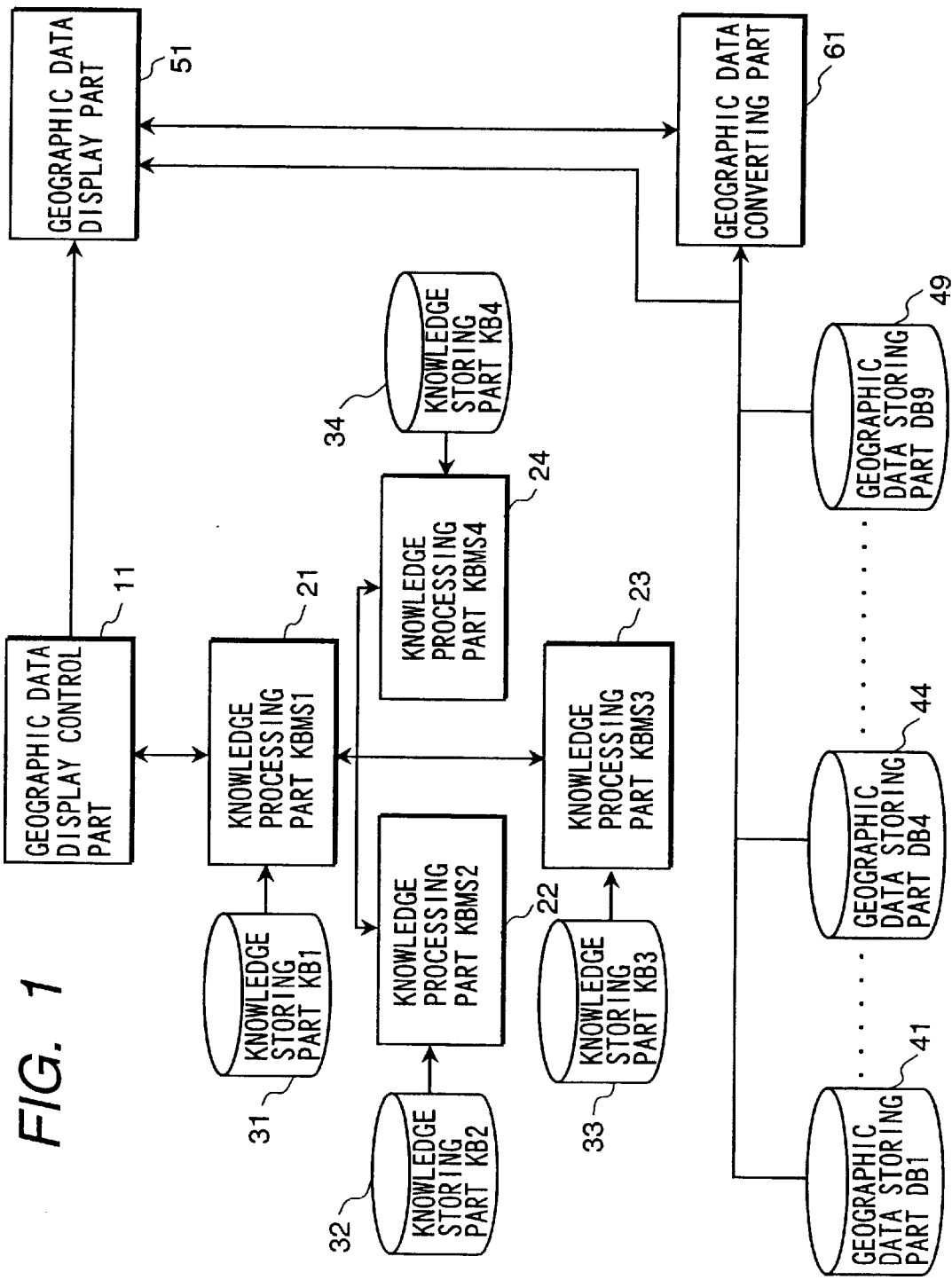
FIG. 1 is a block diagram showing an embodiment of a geographic information display control system in accordance with the present invention.

FIG. 1 is shows an embodiment of a geographic information display control system in accordance with the present invention. Referring to FIG. 1, the geographic information display control system is composed of a geographic data display control part 11, knowledge processing parts 21, 22. 23, and 24, knowledge storing part 31, 32, 33 and 34 individually connected to the knowledge processing parts, geographic data storing parts 41, 44 and 49, a geographic data display part 51, and a geographic data conversion part 61.

The geographic data display control part 11 receives input from a user in order to display geographic data requested by the user. The geographic data display control part 11 displays a selecting screen so that the user may select a job intended to be performed by the user, a drawing and a district used for the job, and inputs the results selected by the user to the knowledge processing part 21 as request geographic data to request the knowledge processing part to execute knowledge processing. Further, the geographic data display control part 11 receives the result of knowledge processing and transmits the result to the knowledge processing part 21 to display the geographic data requested by the user on the geographic data display part 51.

The knowledge processing parts 21, 22, 23 and 24 provide geographic data acquiring conditions for realize a display of the geographic data requested by the user (requested geographic data) in detail using knowledge. The knowledge used at that time is stored in each of the knowledge storing parts 31, 32, 33 and 34. The knowledge processing parts 21, 22, 23 and 24 are abbreviated as KBMS1, KBMS2, KBMS3 and KBMS4, respectively. Further, the knowledge storing parts 31, 32, 33 and 34 are abbreviated as KB1, KB2, KB3 and KB4.

The KBMS1 is different from the other KBMS2, KBMS3 and KBMS4 in contents of the knowledge processing. The KBMS1 manages a field of knowledge which capabilities of knowledge processing of the KBMS2, KBMS3 and KBMS4 deal with. Each of the KBMS2, KBMS3 and KBMS4 manages knowledge in the field subject to the individual part to execute knowledge processing using the knowledge. The KBMS1 receives requested geographic data from the geographic data display control part 11, and judges using the knowledge stored in the KB1 an attribute in regard to what field of geographic data the requested geographic data is composed of. Then, the KBMS1 request the KBMS2, KBMS3 or KBMS4 to execute the knowledge processing corresponding to the attribute. The KBMS2, KBMS3 and KBMS4 receive the knowledge processing requests corresponding to the individual fields from the KBMS1, and execute knowledge processing on acquiring conditions of the geographic data using the knowledge stored in the KB2, KB3 and KB4 to send the results to the KBMS1, respectively. When the KBMS1 recognizes all of the conditions acquiring the geographic data necessary for constructing the requested geographic data from the received processed results, the KBMS1 sends the acquiring conditions to the geographic data display control part 11.

The geographic data storing parts 41 to 49 individually store different kinds of geographic data. Hereinafter, the geographic data storing parts 41, 44 and 49 are abbreviated as DB1, DB4 and DB9, respectively. These items of geographical data are individually divided into many areas to be hierarchically managed. By specifying an area using protocol corresponding to each of the geographic data storing parts, the geographic data is supplied to the geographic data display part 51 or the geographic data converting part 61.

The geographic data display part 51 has a function to overlay items of geographic data stored in the geographic data storing parts and to display the result. The geographic data display part 51 is provided with the knowledge processed result of the requested geographic data from the geographic data display control part 11. The knowledge processed result includes the conditions of acquiring geographic data necessary for display. The geographic data display part 51 sends a geographic data converting request to the geographic data converting part 61 according to the condition of acquiring geographic data. Then, the geographic data display part 51 acquires the geographic data converted in the geographic data converting part 61, or directly acquires geographic data from the geographic data storing parts 41 to 49. The items of geographic data acquired in such a manner are overlaid and displayed on a display displaying part 515 of the geographic data display part 51.

The geographic data converting part 61 converts various kinds of geographic data. In detail, the geographic data converting part 61 executes format conversion between items of geographic data different in format, transformation of a coordinate system such as normalization of a coordinate system. The geographic data converting part 61 is operated by receiving a geographic data conversion request from the geographic data display part 51. The geographic data converting part 61 requests the geographic data storing parts 41 to 49 to sent geographic data to be converted, and output the geographic data after being converted to the geographic data display part 51.

Figure 2:
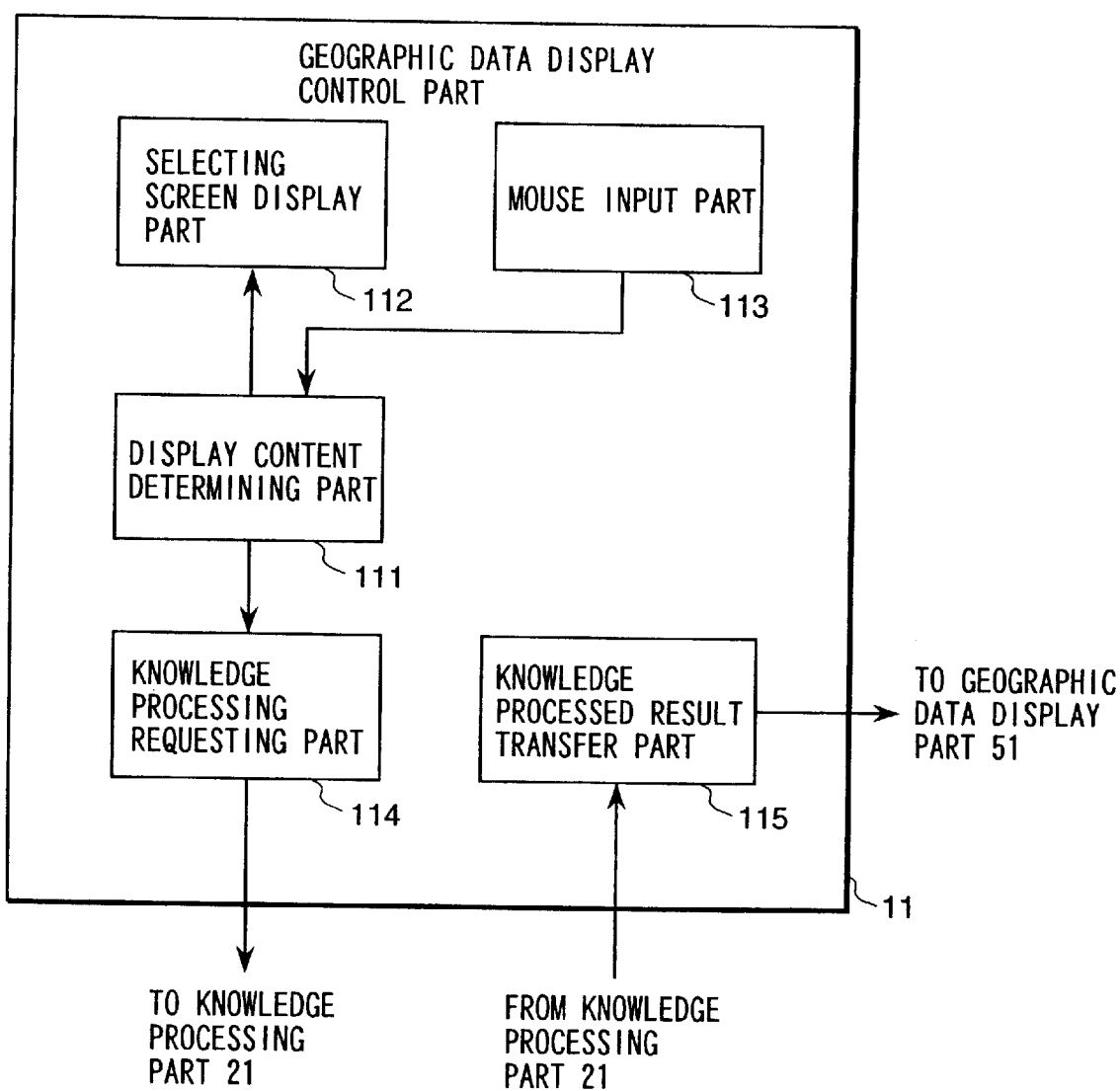
FIG. 2 is a block diagram showing a geographic data display control part.

FIG. 2 shows an example of the geographic data display control part 11. The geographic data display control part 11 is composed of a display content determining part 111, a selecting screen display part 112, a mouse input part 113, a knowledge processing requesting part 114 and a processed result transfer part 115. The display content determining part 111 requests the selecting screen display part 112 to display a screen for selecting a job item, a map and a district so that a user may select the job intended to be performed by the user, the map used for the Job and the district in connection to the job, and determines the job, the map and the district according to user's input using the mouse input part 113. The selecting screen display part 112 receives the request from the display content determining part 111, and displays the screen for selecting the job item, the map and the district. The mouse input part 113 transmits the mouse input from the user to the display content determining part 111. The knowledge processing requesting part 114 transmits the job, the map and the district determined by the display content determining part 111 together as the requested geographic data to the knowledge processing part 21 to request the knowledge processing part 21 to execute knowledge processing. The knowledge processed result transfer part 115 receives from the knowledge processing part 21 the processed result of the knowledge processing which the knowledge processing requesting part 114 requests to the knowledge processing part 21, and transfers the processed result to the geographic data display part 51. Thus, the geographic data requested by the user is displayed on the geographic data display part 51.

Figure 3:
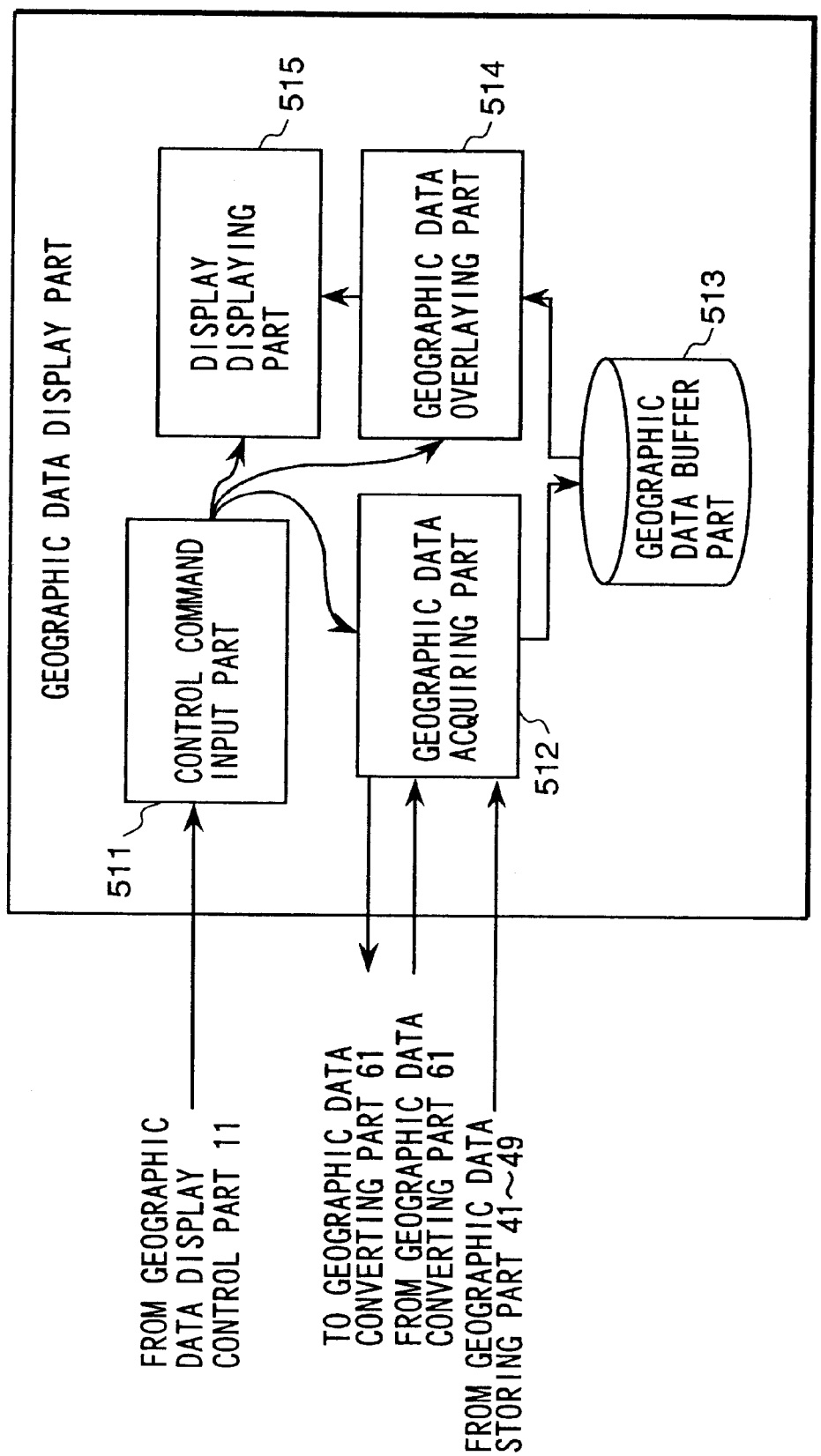
FIG. 3 is a block diagram of the geographic data display part.

FIG. 3 shows an example of the geographic data display part 51. The geographic data display part 51 is composed of a control command input part 511, a geographic data acquiring part 512, a geographic data buffer part 513, a geographic data overlaying part 514 and a display displaying part 515. The control command input part 511 receives the knowledge processed result of the requested geographic data from the geographic data display control part 11. The processed result includes the condition of acquiring the geographic data necessary for displaying. Receiving the processed result, the control command input part 511 transfers the condition of acquiring the geographic data to the geographic data acquiring part 512 to request the geographic data acquiring part 512 to acquire the geographic data. Further, the control command input part 511 sends a command of overlaying map data to the geographic data overlaying part 514 and a command of displaying the overlaid data to the display displaying part 515.

The geographic data acquiring part 512 judges based on the acquiring condition of the geographic data given from the control command input part 511 whether or not data conversion is necessary to the acquired geographic data. If data conversion is necessary to the acquired geographic data, a request of converting the geographic data is sent to the geographic data converting part 61 to acquire the geographic data converted in the geographic data converting part 61. On the other hand, if the data conversion is unnecessary, the geographic data is directly acquired from the geographic data storing parts 41 to 49. The geographic data acquired by the geographic data acquiring part 512 in such a manner is temporarily stored in the geographic data buffer part 513. The geographic data overlaying part 514 overlays a plurality of items of the geographic data stored in the geographic data buffer part 513 according to a command of geographic data overlaying received from the control command input part 511. The display displaying part 515 displays the geographic data overlaid by the geographic data overlaying part 514 according to a command of displaying the overlaid data from the control command input part 511.

Figure 4:
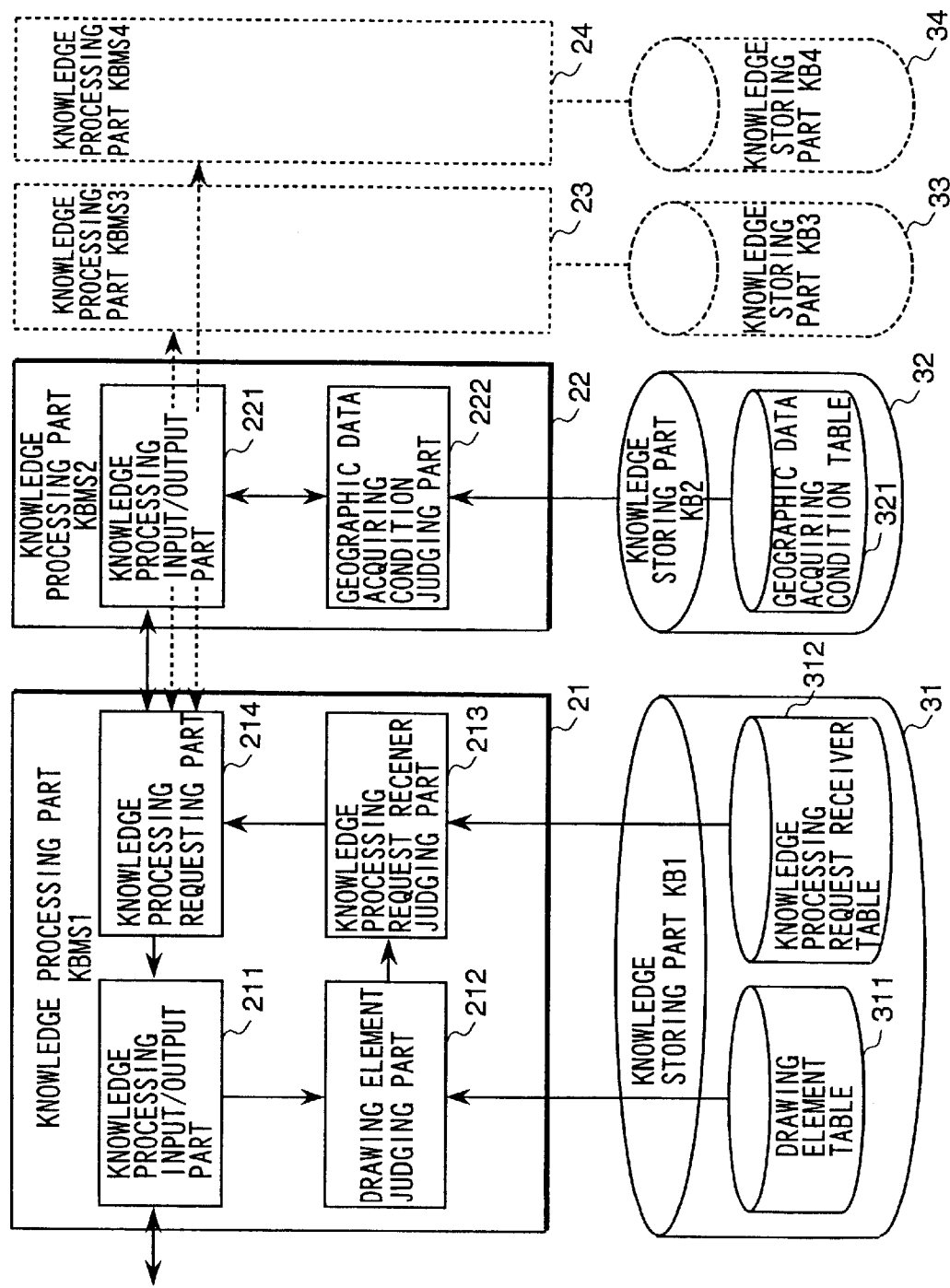
FIG. 4 is a block diagram of the knowledge processing part.

FIG. 4 is a block diagram showing the relationship between the knowledge processing part KBMS1 and the knowledge processing parts KBMS2, KBMS3, KBMS4. The KBMS1 is different from the other of KBMS2, KBMS3 and KBMS4 in construction. The constructions of the KBMS3 and KBMS4 are the same as that of the KBMS2.

The KBMS1 is composed of a knowledge processing input/output part 211, a drawing element judging part 212, a knowledge processing request receiver judging part 213 and a knowledge processing requesting part 214. The KB1$_{(31)}$ connected to the KBMS1$_{(21)}$ is composed of a drawing element table 311 and a knowledge processing request receiver table 312. The knowledge processing input/output part 211 sends the requested geographic data received from the geographic data display control part 214 to the drawing element judging part 212, and outputs the acquiring condition of the geographic data received by the knowledge processing requesting part 214 to the geographic data display control part 11. Using the knowledge stored in the drawing element table 311, the drawing element judging part 212 judges the attribute of the request geographic data received from the knowledge processing input/output part 211, that is, what field of element data the requested geographic data is composed of. The judged result is transmitted to the knowledge processing request receiver judging part 231.

The knowledge processing request receiver judging part 213 receives each of the fields of element data composing the requested geographic data from the drawing element judging part 212, and determines a request receiver of the knowledge processing for each of the fields of element data. Each of the request receivers of knowledge processing is transmitted to the knowledge processing requesting part 214. The knowledge processing request receiver judging part 214 requests the KBMS2 or the KBMS3 or the KBMS4 to execute knowledge processing based on the knowledge processing receiver for each of the fields of element data determined by the knowledge processing request receiver judging part 213. The knowledge processing request receiver judging part 214 receives the knowledge processing result of the acquiring condition of geographic data from each of the knowledge processing parts. As the acquiring conditions of geographic data for all the items of element data are obtained, the acquiring conditions of geographic data are input to the knowledge processing input/output part 211.

The construction of the KBMS2 will be described below. The KBMS2 is composed of a knowledge processing input/output part 221 and geographic data acquiring condition judging part 212. The KB2$_{(32)}$ connected to the KBMS2$_{(22)}$ is composed of a geographic data acquiring condition table 321. The knowledge processing input/output part 221 sends the knowledge processing request received from the KBMS1$_{(21)}$ to the geographic data acquiring condition judging part 222. Further, the knowledge processing input/output part 221 sends the acquiring condition the geographic data obtained by the geographic data acquiring condition judging part 222 to the KBMS1$_{(21)}$. To the knowledge processing request received from the knowledge processing input/output part 221, the geographic data acquiring condition judging part 222 obtains an acquiring condition of geographic data corresponding to each of the items of element data using knowledge stored in the geographic data acquiring condition table 321, and sends the knowledge processed result of the acquiring condition of geographic data to the knowledge processing input/output part 221.

As described above, the knowledge processing part KBMS1 manages the other KBMS2, KBMS3 and KBMS4 in what field each of the KBMS2, KBMS3 and KBMS4 can judge the acquiring condition of geographic data. Further, each of the KBMS2, KBMS3 and KBMS4 judges the acquiring condition Of geographic data in each of the fields. Therefore, by inputting the knowledge processing request to the KBMS1, the KBMS1 can make use of capability of knowledge processing owned by the KBMS2 or the KBMS3 or the KBMS4 corresponding to the field of element data.

Operation of geographic data acquisition will be described below. Initially, job script will be described. The job script means a series of commands that conditions for acquiring requested geographic data or geographic data are described in text according to a specified grammar. In this embodiment, exchange of information between components is performed using the job script. The job script is rewritten in a process of processing, or a part of the job script is extracted to execute processing. The job used in this embodiment is that "in order to conduct a road construction project in a district (district A), an overlaid image of a topographical map and an image is displayed". The content of job is described by the job script to be processed.

Figure 8:
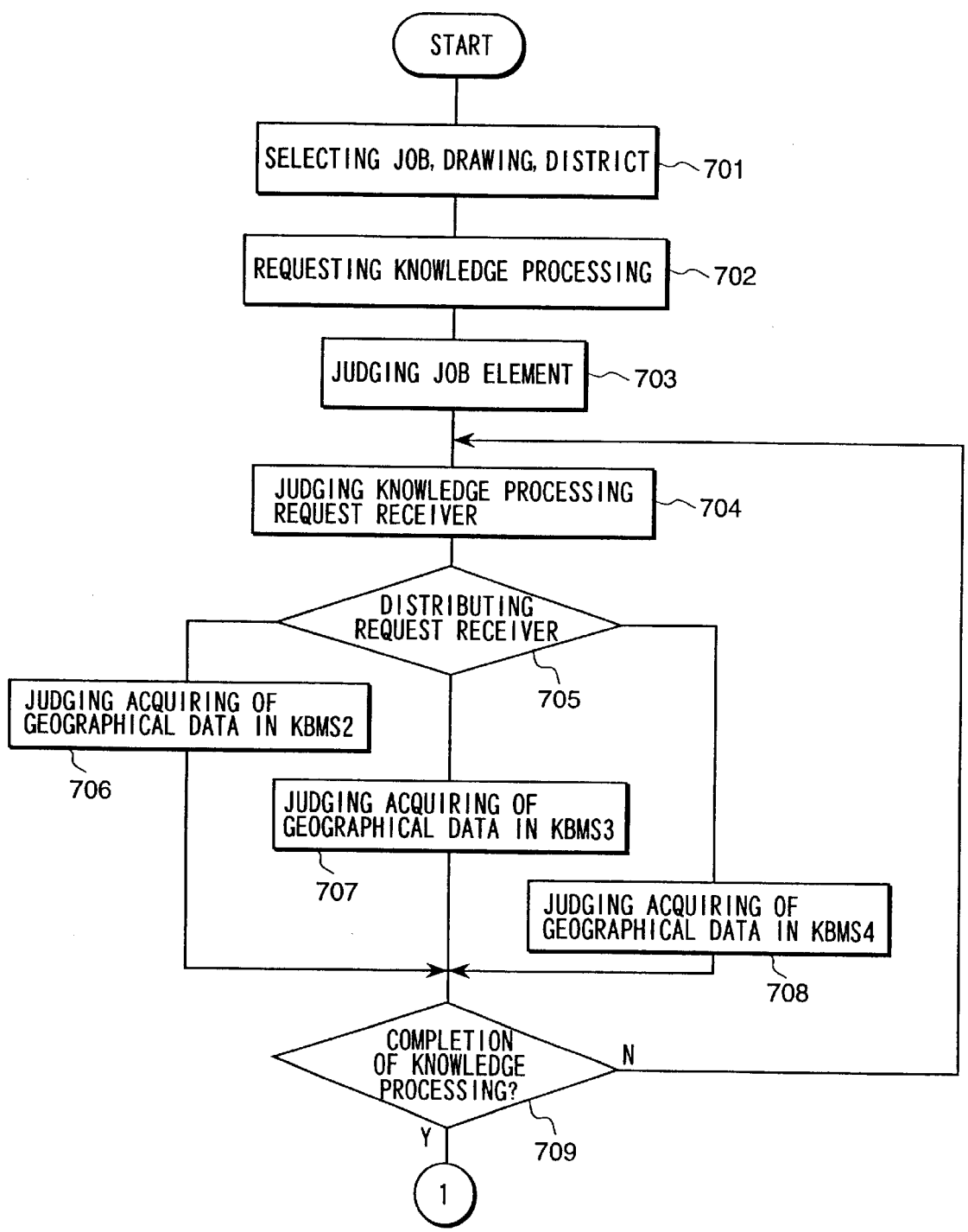
FIG. 8 is a flowchart for explaining job embodying processing.

In the job processing of the present invention, job embodying processing for embodying the job content is initially executed, and then the embodied job is executed to display the geographic. Initially, operation of the job embodying processing will be described, referring to the flowchart of FIG. 8. The job embodying processing is started by that the user selects a job, a drawing and a district using the geographic data display control part 11. The display content determining part 111 displays selecting screens of jobs, drawings, districts on the selecting image display part 112 so that the user may select a job intended to be performed by the user, a drawing and a district used for the job. Then, the job, the drawing and the district is determined by the user's inputs using the mouse input part 113.

FIG. 5 shows a selecting screen displayed by the selecting image display part 112. The selecting screens are successively displayed in order of a job selecting screen 116, a drawing selecting screen 117 and a district selecting screen 118. Jobs capable of being selected by a user are displayed in a menu area 116A of the job selecting screen 116, and the user may select a desired job among the displayed jobs using the mouse. Similarly, a drawing and a district corresponding to the job are selected from a menu area 117A of the drawing selecting screen 117 and a menu area 118A of the district selecting screen 111, respectively. As the user touches a determine switch 116B using the mouse, the job selected in the menu area 116A is determined as the selection of the user. Then, the next drawing selecting screen 117 appears. Similarly, by touching the determine switches 117B, 118B, the drawing and the district are determined, respectively. Therein, when each of the cancel switches 116C, 117C, 118C is touched, the displayed screen is returned to the precedent screen.

Supposing that the user selects and determines an item "ROAD CONSTRUCTION PLAN" in the job selecting screen 116 Successively, the drawing selecting screen 117 is displayed in the screen. The item "ROAD CONSTRUCTION PLAN" selected in the job selecting screen 116 is displayed in a selected job display window 117D in the drawing selecting screen 117. Next, an item "IMAGE OVERLAID TOPOLOGICAL MAP" is selected in the menu area 117A in the drawing selecting screen 117, and make determination. Successively, the district selecting screen 118 is displayed, and the item "ROAD CONSTRUCTION PLAN" selected in the job selecting screen 116 is displayed in a selected job display window 118D and the item "IMAGE OVERLAID TOPOLOGICAL MAP" selected in the drawing selecting screen 117 is displayed in a selected drawing display window 118E. Finally, in the district selecting screen 118, an item "DISTRICT A" is selected from a menu area 118A and makes determination. Thus, The items "ROAD CONSTRUCTION PLAN", "IMAGE OVERLAID TOPOLOGICAL MAP" and "DISTRICT A" are determined as the job, the drawing and the district, respectively (Step 701).

The knowledge processing request part 114 generates job script of information on the job, the drawing and the district determined in the display content determining part 111, and request the KBMS1$_{(31)}$ to execute knowledge processing to the job script (Step 702). Here, contents of knowledge stored in the knowledge storing parts KB1, KB2, KB3 and KB4 will be described below.

An example of the contents of knowledge stored in the KB1 is shown in FIG. 6. An example of a drawing element table 313 corresponds to the content of the drawing element table 311. A drawing item 313A of the table stores names of drawing, an element data item 313B stores elements of geographical data used in the corresponding drawings, and a classification item 313C stores information on what classifications the elements in the element data item 313B belong to. By this table, correspondence between the drawing and the element data is indicated, and accordingly geographic data used as each item of element data of a drawing and a name of classification of the element data can be known.

An example of knowledge processing request table 314 corresponds to the contents of the knowledge processing request table 312. A district item 314A stores names of district, and a classification item 314B stores classifications of element data necessary for work. Information on the knowledge processing parts of the knowledge processing request receivers corresponding to the classification of element data in each of districts is stored in a knowledge processing request receiver 314C. By this table, a knowledge processing part to be used as a knowledge processing request receiver can be known from a name of district and a name of classification.

FIG. 7 shows an example of the contents of knowledge stored in the knowledge storing parts KB2, KB3 and KB4. The example of the geographic data acquiring condition table 322 of the knowledge storing part KB2 is the contents of the knowledge processing acquiring condition table 321. Similarly, the example of the geographic data acquiring condition table 332 of the knowledge storing part KB3 is the contents of the knowledge processing acquiring condition table 331. The example of the geographic data acquiring condition table 342 of the knowledge storing part KB4 is the contents of the knowledge processing acquiring condition table 341.

Each items of the geographic data acquiring condition table 322 of the knowledge storing part KB2 will be described. Names of district are stored in a district item 322A, and names of geographic data to be used as element data are stored in an element data item 322B. Names of database in the geographic data storing parts storing the geographic data are stored in a DB name item 322C as a detailed condition of acquiring the geographic data. Methods of acquiring geographic data to be obtained from a database storing the geographic data are stored in a data acquiring method 322D. A data conversion item 322E stores conversion methods used for converting description format of the geographic data when the description format of the geographic data stored in the database is different from the description format of the geographic data used in the job. In this embodiment, since a platform capable of knowing an address of database by a DB name, the DB name item 322C stores only DB names. The "FTP" stored in the data acquiring method item 322D indicate to use file transfer protocol, and the "SQL" indicates to acquire geographic data using a database inquiry language.

Using the knowledge of the geographic data acquiring condition table 321 of the KB2 as described above, the condition of acquiring geographic data corresponding to the combination of the district and the element data can be obtained. Similarly to the geographic data acquiring condition table 321 of the KB2, the geographic data acquiring condition table 331 of the KB3 and the geographic data acquiring condition table 341 of the KB4 contain knowledge, and the condition of acquiring geographic data can be obtained from these tables.

The job script sent to the KBMS1 in Step 702 is a received by the knowledge processing input/output part 211 to be input to the drawing element judging part 212. The job script is compared with the content of the job element table 311 in the drawing element judging part 212. Since the drawing for the job here is an image overlaid topographical map, it can be understood that an aerial photograph, a contour map, a river map, a road map and a house map are necessary as the items of element data, and the classification of each of the items of element data is either of an image, a topographical map or a residential area map. The job script is rewritten to processing combinations of an aerial photograph acquiring part, a contour map acquiring part, a river map acquiring part and a house map acquiring part corresponding to combinations of the items of element data of the drawing for the job (Step 703).

Successively, the processing for acquiring each item of the element data of the drawing is embodied. This processing is executed by inputting the job script of the processing of acquiring each item of the element data to the knowledge processing request receiver judging part 213. The knowledge processing request receiver judging part 213 extracts the district and the classification of the element data to be acquired from the job script received from the drawing element judging part 212, and obtains a receiver of the knowledge processing by comparing the extracted district and the classification with the contents of the knowledge processing request receiver table 312.

In the case of the present embodiment, since the district is "district A" and the classification of aerial photograph is "image" when a request receiver in regard to the aerial photograph is searched, it can be understood that the knowledge processing should be requested to the MS2 to be executed (Step 704). Then, the request receiver of the knowledge processing determined by the knowledge processing request receiver judging part 213 is sent to the knowledge processing requesting part 214, and the job script of the aerial photograph acquiring part is transferred to the KBMS2 by the knowledge processing requesting part 214 (Step 705). The job script of the aerial photograph acquiring part is received by the knowledge processing input/output part 221, and input to the geographic data acquiring condition judging part 222. Since the district is "district A" and the element data is aerial photograph, it can be understood by applying the example of geographic data acquiring condition table 322 of the KB2 that the name of the database storing the geographic data to be obtained is DB1, the method of acquiring the geographic data to be obtained from the DB1 is FTP, and the description format of the geographic data capable of being displayed in the geographic data display part 51 can be obtained by executing conversion through normalization processing. Thus, the condition of acquiring the geographic data can be known.

There, the job script of the aerial photograph acquiring part is rewritten in adding DB1 as the database acquiring the data, FTP as the data acquiring method and normalization processing as the data conversion method (Step 706). The job script of the aerial photograph acquiring part rewritten by the geographic data acquiring condition judging part 221 is sent to the KBMS1 by the knowledge processing input/output part 221.

In Step 706, it is judged whether all of the knowledge processing are completed or not (Step 709). In the case of the present embodiment, the above-described processing is continued until the other processing of the contour map acquiring part, the river map acquiring part, the road map acquiring part and the house map acquiring part is completed. The processing for the other element data is executed similarly to the process of the above-described aerial photograph. By applying the example of knowledge processing request receiver table 314, it can be understood that the knowledge processing of the contour map, the river map and the house map is requested to the KBMS3 because they are topographical maps, and the knowledge processing of the house map is requested to the KBMS4 because it is a residential area map. The knowledge processing similar to that in Step 706 is executed in Step 707 when the knowledge processing is requested to the KBMS3, and in Step 708 when the knowledge processing is requested to the KBMS4.

As the conditions of acquiring the geographic data for all the requested element data are obtained, the knowledge processing requesting part 214 unifies the acquiring conditions of all the data in a single job script, and then sends it to the knowledge processing input/output part 211. The unified job script is input to the geographic data display control part 11. By adding the conditions of acquiring all the element data to the job script, the job embodying processing as the first step of the job is completed.

Figure 9:
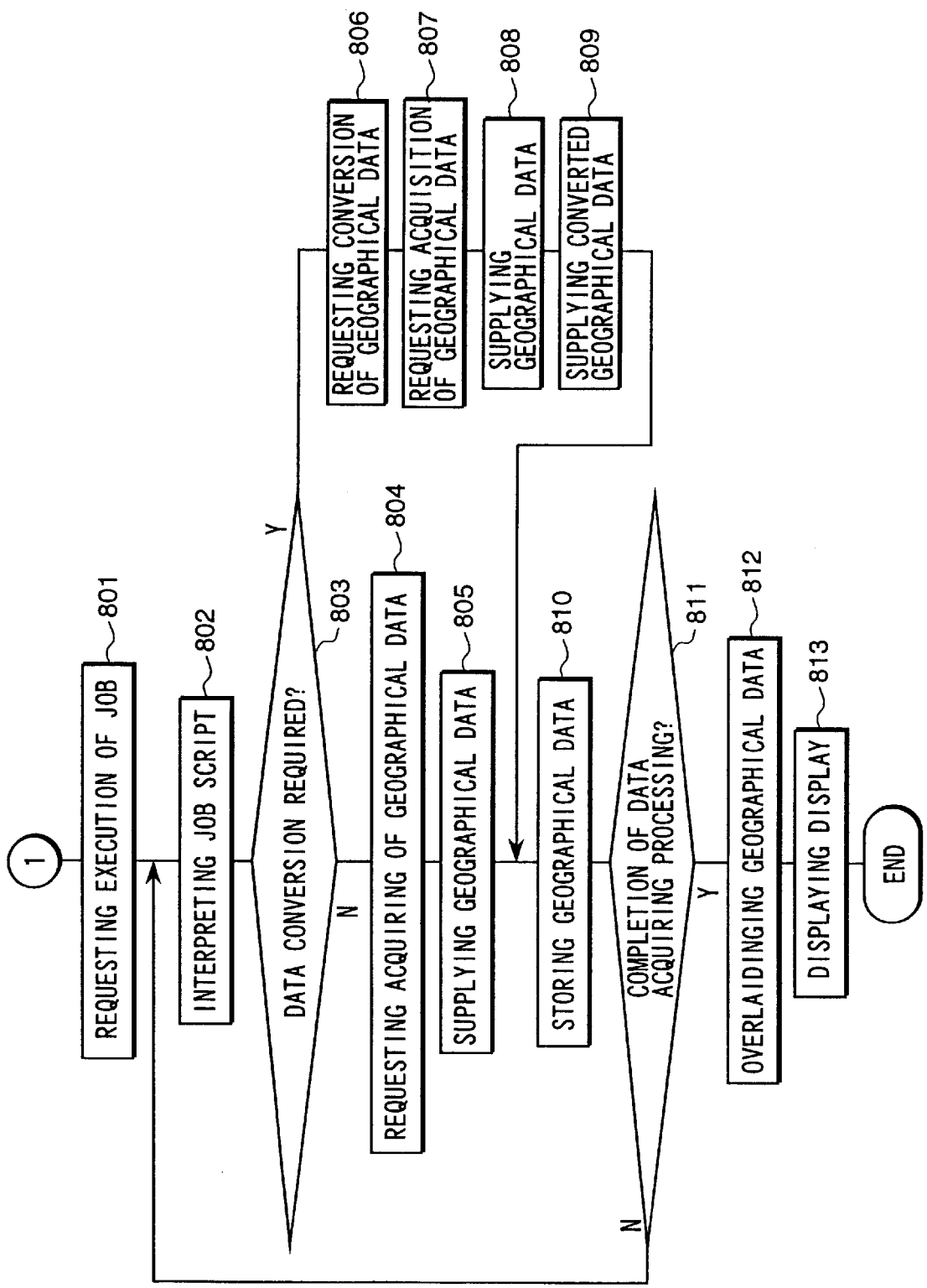
FIG. 9 is a flowchart for explaining geographic data displaying processing.

Operation of the geographic data display processing will be described below, referring to the flowchart of FIG. 9. The job script has been rewritten to the conditions of the acquiring the geographic data by the job embodying processing. The job is that "in order to conduct a road construction project in a district (district A), an overlaid image of a topographical map and an image is displayed", and all the conditions of the acquiring the geographic data necessary for display are described.

The geographic data display processing is started with the geographic data display control part 11 giving a request of executing the job to the geographic data display part 51 (Step 801). The job script transferred to the geographic data display part 51 is received and interpreted by the control command input part 511 (Step 802). Initially, the control command input part 511 transfers the conditions of acquiring the geographic data to the geographic data acquiring part 512 to request to acquire the geographic data. Based on the conditions of acquiring the geographic data received from the control command input part 511, the geographic data acquiring part 512 judges whether or not conversion of the geographic data is necessary (Step 803).

In the case of the aerial photograph of the district A, the geographic data can be acquired from the DB1 by FTP. It can be understood from the job script that the geographic data needs conversion by the normalization processing. Therefore, the geographic data acquiring part 512 issues a request of geographic data conversion to the geographic data converting part 61 (Step 806). The geographic data converting part 61 issues a request of acquiring the geographic data of the aerial photograph to the DB1 in order to obtain the geographic data to be converted (step 807). Receiving the request of acquiring the geographic data, the DB1 provide the geographic data converting part 61 with the image data of the aerial photograph (Step 808). The geographic data converting part 61 executes normalization processing to the acquired image data of the aerial photograph, and supplies the geographic data after conversion to the geographic data acquiring part 512 (step 809). The geographic data acquiring part 512 stores the supplied geographic data in the geographic data buffer part 513 (Step 810).

Since the processing of the aerial photograph acquiring part is completed in this manner, it is judged whether or not the geographic data display processing is completed (Step 811). Therein, the above-described geographic data display processing is continued until the other processing of the contour map acquiring part, the river map acquiring part, the road map acquiring part and the house map acquiring part is completed. Similarly to the case of the aerial photograph, the contour map, the river map and the road map are acquired from the DB4. The house map is acquired from the DB9 using SQL. Based on the example of geographic data acquiring condition table 342, it is described in the job script that data conversion of this geographic data is not executed because this geographic data can be directly displayed by the geographic data display part 51. The geographic data acquiring part 512 directly issues a request of acquiring the house map to the DB9 (Step 804). The DB9 received the request of acquiring the geographic data provide the geographic data acquiring part 512 with the map data of houses (Step 805).

Figure 10:
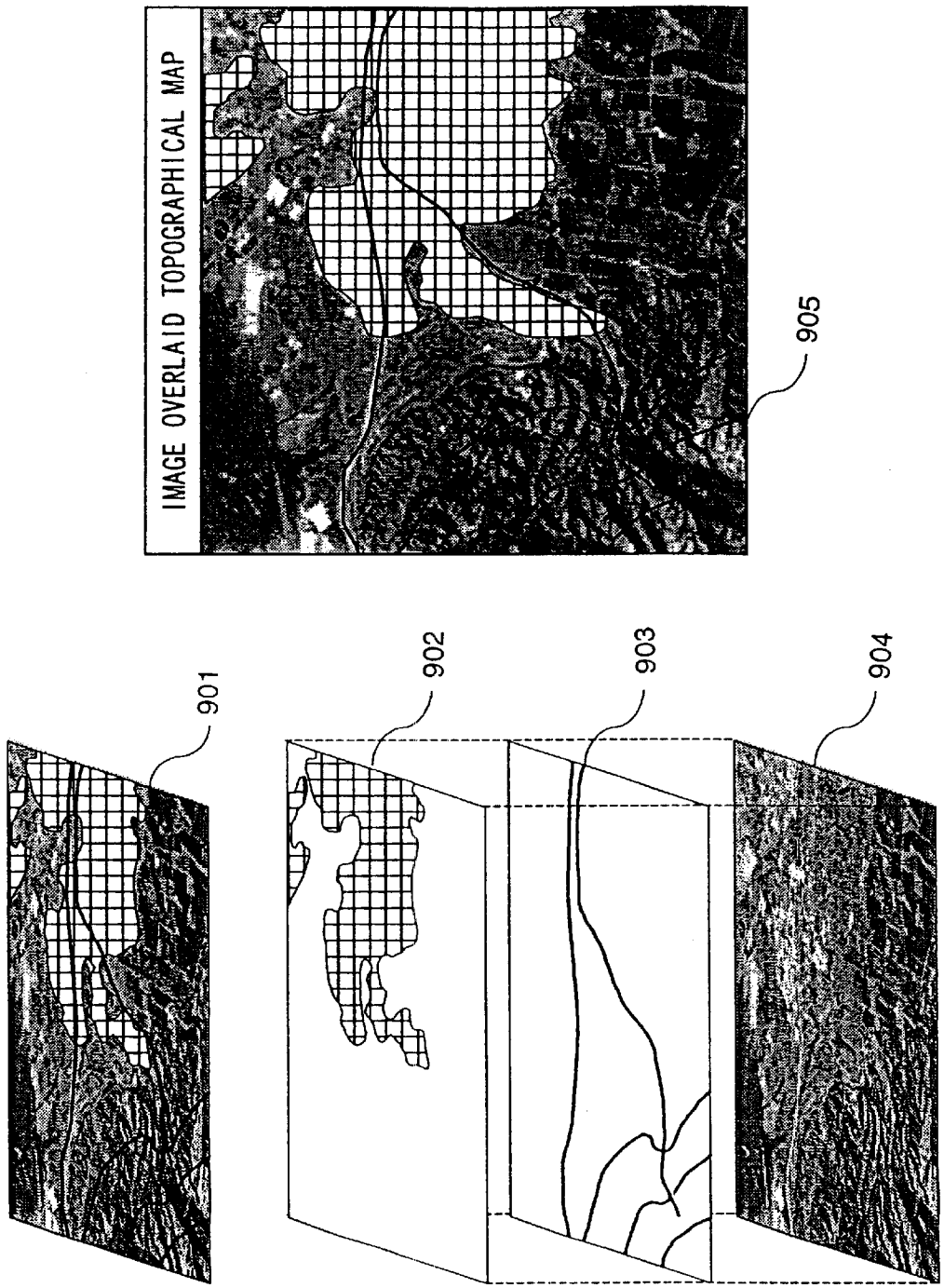
FIG. 10 is a view showing overlaying of items of geographic data.

As acquiring of all the geographic is completed, the control command input part 511 gives a command of overlaying the geographic data to the geographic data overlaying part 514. The geographic data overlaying part 514 acquires the geographic data from the geographic data buffer part 513, and execute overlaying so that the coordinates of the items of element data agree with one another (Step 812). FIG. 10 shows the overlaying of the items of element data. By overlaying the aerial photograph 904, the topographical map 903 composed of the contour map and the road map, and the house map 902 showing positions of residential areas, an image overlaid topographical map 901 can be obtained.

As overlaying of the geographical data is completed, the control command input part 511 gives a command of display the overlaid geographical data to the display displaying part 514. The geographical data overlaid by the geographic data overlaying part 514 is displayed on a display by the display displaying part 515 (Step 813). The image overlaid topographical map of FIG. 10 shows an image displayed on the display. As described above, the geographic data display processing is completed.

The items of geographic data such as aerial photograph 904, the topographical map 903 and the house map 903 shown in FIG. 10 are generally different one another in preparation organization and in format of geographic data. In order to overlaying these items of geographic data, specific operation is necessary to each of the items of geographic data. According to the present invention, various kinds of geographic data different in the preparation organization can be used by employing the acquiring method and the conversion method corresponding to each of the items of geographic data. Further, the user can obtain geographic data necessary for a desired display by inquiring the knowledge processing request receiver judging means without knowledge on where the searched geographic data is or without being aware of where the knowledge is prepared. Further, it is easy to unify and use items of data different in description format distributed in a network, and particularly the data can be widely and mutually used by commonly using the knowledge in regard to the method of using the data.

In the present invention, a memory medium such as a CD-ROM contains the geographic data display part 11 excluding the mouse input part 113, the geographic data display part 51 excluding the display displaying part 515, the knowledge processing parts 21, 22, 23 and 24, and the geographic data converting part 61 as processing procedures such as programs, and memory media such as CD-ROMs contain the contents of the knowledge storing parts 31, 32, 33 and 34, and the geographic data storing parts 41 to 49 as data. Therefore, the present invention can be performed using a calculation processor such as a computer.

Another embodiment in accordance with the present invention will be described below. Instead of the geographic data storing parts 41 to 49 of FIG. 1 in the above-mentioned embodiment, an information source periodically supplying data such as a sensor or an information source dynamically producing data such as a simulation server may be used. Further, not only the places storing data as data supplying places are described in the knowledge, but the processing procedures to acquire data may be also described in the knowledge. For example, when a satellite photograph is required, processing to plan an orbit of a satellite and to execute scheduling of the satellite may be described in the knowledge.

In the above-described embodiment, the requests of processing are sequentially input to the different knowledge processing parts. However, in a case where the processing request receivers are different, all the requests of processing may be input to the knowledge processing request receivers to execute the knowledge processing in parallel. By doing so, efficiency of the processing can be further improved. The parallel execution of the processing can be realized by that a requested processing reply and receive part for recognizing completion of requested processing is added, and the knowledge processing part received the processing request replies to the requested processing reply and receive part. The knowledge processing part 21 sends the processing request to a knowledge processing request receiver after judging the knowledge processing request receiver from the job script, and executes processing of the next job element without waiting a reply from the knowledge processing request receiver. After making all the requests of processing in such a manner, the knowledge processing part 21 makes inquiry to the requested processing reply and receive part. Rewriting of the job script is performed in parts of the element data in regard to received replies. The inquiry processing is repeated until all the replies are obtained, and the knowledge processing is completed when all the replies are obtained.

What is claimed is:

1. A geographic information display control system comprising:

a geographic data display;

a job selecting input device providing a job selection input;

a plurality of geographical data storage units storing geographic data;

a geographic data display controller receiving the job selection input to generate a job script and to capture the geographic data stored in said geographic data storage units in order to display the geographic data;

a plurality of geographic data acquiring processors to define acquiring conditions, including the job script, to acquire the geographic data stored in said plurality of geographic data storage units; and a processing request receiver to receive attribute information of geographic data requested from said geographic display controller, and to determine which geographic data acquiring processor among said plurality of geographic data acquiring processors is requested to execute processing, wherein said geographic data display controller captures geographic data from said geographic data storage units based on an acquiring condition from said geographic data acquiring processor.

2. A geographic information display control system according to claim 1, wherein said geographic data includes map data and image data, and said acquiring conditions include information of which geographic data storage unit among said plurality of geographic data storage units the geographic data requested from said geographic data display controller is captured from, and said attribute information includes a kind and a district of the geographic data requested from said geographic data display controller, and said processing request receiver determines a geographic data acquiring processor to be requested to execute processing based on a capability of acquiring the geographic data from said plurality of geographic storage units.

3. A geographic information display control system according to claim 1 wherein said geographic data display controller, said processing request receiver and said plurality of geographic data acquiring processors are constructed of programs stored in a memory medium.

4. A geographic information display control system comprising:

a geographic data display;

a job selecting input device providing a job selection input;

a plurality of geographical data storage units storing geographic data;

a geographic data display controller receiving the job selection input to generate a job script and to capture the geographic data stored in said geographic data storage units in order to display the geographic data;

a plurality of first knowledge processors to obtain and instruct acquiring conditions through knowledge processing, said acquiring conditions including from which geographic data storage unit among said plurality of geographic data storage units geographic data requested in said geographic data display controller is acquired; and a second knowledge processor to receive attribute information, including a kind and a district of the geographic data requested from said geographic data display controller, and determining, based on capability of acquiring geographic data from said plurality of geographic data storage unit through knowledge processing, which first knowledge processor among said plurality of first knowledge processors is requested to execute processing, wherein said geographic data display controller captures geographic data from said geographic data based on the acquiring condition obtained from said first knowledge processor.

5. A geographic information display control system comprising:

a geographic data display;

a job selecting input device providing a job selection input;

a plurality of geographical data storage units storing geographic data including map data and image data;

a geographic data display controller receiving the job selection input to generate a job script and to capture the geographic data stored in said geographic data storage units in order to display the geographic data;

a plurality of first knowledge processors to obtain acquiring conditions for acquiring the geographic data stored in said plurality of geographic data storing means;

a plurality of knowledge storage units to store attribute data for obtaining said geographic data acquiring conditions, one of said plurality of knowledge storing units being provided for each of said first knowledge processors; and a second knowledge processor to receive attributes of the geographic data requested from said geographic data display controller, and determining, based on contents of the attribute data owned by said plurality of knowledge storage devices through knowledge processing, which first knowledge processor among said plurality of first knowledge processors is requested to execute processing, wherein said geographic data display controller captures geographic data from said geographic data storage devices based on the acquiring condition obtained from said first knowledge processors.

6. A knowledge processing system for capturing geographic data stored in a plurality of geographic databases storing the geographic data including map data and image data and displaying the geographic data, which comprises:

a display;

a job selecting input device providing a job selection input;

a plurality of first knowledge processors to obtain acquiring conditions, including a job script based on the job selection input, to acquire requested geographic data required to be displayed on said display;

a plurality of knowledge storage units to store attribute data for obtaining said geographic data acquiring conditions, one of said plurality of knowledge storage units being provided for each of said first knowledge processors; and a second knowledge processor to receive said attribute information of the requested geographic data, and determining through knowledge processing which first knowledge processor among said plurality of first knowledge processors is requested to execute processing.

7. A geographic information display control system according to claim 1 wherein the job selecting input device comprises a job selecting screen.

8. A geographic information display control system according to claim 7 and further including a job element table to be compared to said job script.

9. A geographic information display control system according to claim 8 wherein said job script is rewritten to processing combinations of an aerial photograph acquiring part, a contour map acquiring part, a river map acquiring part, and a house map acquiring part corresponding to combinations of element data of a drawing for the selected job.

10. A geographic information display control system according to claim 7 wherein said job script is rewritten to processing combinations of an aerial photograph acquiring part, a contour map acquiring part, a river map acquiring part, and a house map acquiring part corresponding to combinations of element data of a drawing for the selected job.

11. A geographic information display control system according to claim 1 and further including a job element table to be compared to said job script.

12. A geographic information display control system according to claim 11 wherein said job script is rewritten to processing combinations of an aerial photograph acquiring part, a contour map acquiring part, a river map acquiring part, and a house map acquiring part corresponding to combinations of element data of a drawing for the selected job.

13. A geographic information display control system according to claim 1 wherein said job script is rewritten to processing combinations of an aerial photograph acquiring part, a contour map acquiring part, a river map acquiring part, and a house map acquiring part corresponding to combinations of element data of a drawing for the selected job.

14. A geographic information display control system according to claim 6 wherein the job selecting input device comprises a job selecting screen.

15. A geographic information display control system according to claim 14 and further including a job element table to be compared to said job script.

16. A geographic information display control system according to claim 15 wherein said job script is rewritten to processing combinations of an aerial photograph acquiring part, a contour map acquiring part, a river map acquiring part, and a house map acquiring part corresponding to combinations of element data of a drawing for the selected job.

17. A geographic information display control system according to claim 14 wherein said job script is rewritten to processing combinations of an aerial photograph acquiring part, a contour map acquiring part, a river map acquiring part, and a house map acquiring part corresponding to combinations of element data of a drawing for the selected job.

18. A geographic information display control system according to claim 6 and further including a job element table to be compared to said job script.

19. A geographic information display control system according to claim 18 wherein said job script is rewritten to processing combinations of an aerial photograph acquiring part, a contour map acquiring part, a river map acquiring part, and a house map acquiring part corresponding to combinations of element data of a drawing for the selected job.

20. A geographic information display control system according to claim 6 wherein said job script is rewritten to processing combinations of an aerial photograph acquiring part, a contour map acquiring part, a river map acquiring part, and a house map acquiring part corresponding to combinations of element data of a drawing for the selected job.

* * * * *